(12) United States Patent
Bao (10) Patent No.: US 12,467,515 B2
(45) Date of Patent: Nov. 11, 2025

(54) SOLAR BRACKET WITH DAMPING MECHANISM

(71) Applicant: SHANGHAI SIPOO NEW TECHNOLOGY CO., LTD., Shanghai (CN)

(72) Inventor: Weiming Bao, Shanghai (CN)

(73) Assignee: SHANGHAI SIPOO NEW TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/704,466

(22) PCT Filed: Oct. 14, 2022

(86) PCT No.: PCT/CN2022/125350
§ 371 (c)(1),
(2) Date: Apr. 25, 2024

(87) PCT Pub. No.: WO2023/071830
PCT Pub. Date: May 4, 2023

(65) Prior Publication Data
US 2025/0237290 A1    Jul. 24, 2025

(30) Foreign Application Priority Data
Oct. 28, 2021    (CN) .......................... 202122606001.9

(51) Int. Cl.
*H02S 20/30* (2014.01)
*F16F 15/20* (2006.01)
*H02S 20/32* (2014.01)

(52) U.S. Cl.
CPC .............. *F16F 15/20* (2013.01); *H02S 20/32* (2014.12)

(58) Field of Classification Search
None
See application file for complete search history.

(56) References Cited

U.S. PATENT DOCUMENTS 10,594,253 B2 * 3/2020 Henderson ............ F24S 30/425
11,209,337 B1 * 12/2021 Needham .............. G01M 9/062
(Continued)

FOREIGN PATENT DOCUMENTS

CN    201832295    5/2011
CN    209265276    8/2019
(Continued)

OTHER PUBLICATIONS

"International Search Report (Form PCT/ISA/210) of PCT/CN2022/125350", mailed on Dec. 15, 2022, with English translation thereof, pp. 1-5.

*Primary Examiner* — Steven M Marsh
(74) *Attorney, Agent, or Firm* — JCIPRNET (57) ABSTRACT

A solar bracket with a damping mechanism is provided and includes: a bracket structure including a fixed component and a rotating component; a solar panel installed on the rotating component; and a damping mechanism including a rotating assembly and a damping component. The rotating assembly includes a first rotating part and a second rotating part, the first rotating part is fixedly installed on the rotating component, the second rotating part is connected to the damping component, the first rotating part is transmitted and connected to the second rotating part, and a rotation radius of the first rotating part is greater than that of the second rotating part, when the rotating component drives the first rotating part to rotate, the first rotating part drives the second rotating part to rotate, and the second rotating part drives the damping component to move to limit a rotation speed of the rotating component.

16 Claims, 7 Drawing Sheets

(56) References Cited

U.S. PATENT DOCUMENTS

| | | | | |
|---|---|---|---|---|
| 2017/0359017 A1* | 12/2017 | Corio | ............... | F16M 11/18 |
| 2018/0254740 A1* | 9/2018 | Corio | ............... | F16F 15/022 |
| 2021/0167721 A1* | 6/2021 | Chaouki Almagro | ............... | |
| | | | | F16F 15/035 |
| 2023/0124630 A1* | 4/2023 | Corio | ............... | F24S 25/12 |
| | | | | 126/600 |
| 2023/0170841 A1* | 6/2023 | Li | ............... | H02S 20/32 |
| | | | | 136/244 |
| 2023/0223893 A1* | 7/2023 | LoBue | ............... | F16F 9/0254 |
| 2024/0240835 A1* | 7/2024 | Sokol | ............... | F24S 25/634 |
| 2024/0283393 A1* | 8/2024 | Au | ............... | F24S 30/425 |
| 2025/0003638 A1* | 1/2025 | Sokol | ............... | H02S 30/00 |
| 2025/0007448 A1* | 1/2025 | Cherukupalli | ............... | H02S 20/30 |

FOREIGN PATENT DOCUMENTS

| | | | | |
|---|---|---|---|---|
| CN | 110247622 | | 9/2019 | |
| CN | 111431475 | | 7/2020 | |
| CN | 213305517 | | 5/2021 | |
| DE | 102022102605 A1 * | | 8/2023 | ............ F24S 25/12 |
| WO | WO-2023071830 A1 * | | 5/2023 | |

* cited by examiner

SOLAR BRACKET WITH DAMPING MECHANISM

CROSS-REFERENCE TO RELATED APPLICATION

This application is a 371 of international application of PCT application serial no. PCT/CN2022/125350, filed on Oct. 14, 2022, which claims the priority benefit of China application no. 202122606001.9, filed on Oct. 28, 2021. The entirety of each of the above mentioned patent applications is hereby incorporated by reference herein and made a part of this specification.

TECHNICAL FIELD

The present invention involves solar brackets field, and further involves solar brackets with damping mechanisms.

TECHNICAL BACKGROUND

Photovoltaic tracking bracket is a common tracking device in the field of solar photovoltaic power generation, which can adjust the angle of the solar panel. In such case, the solar panel is directly illuminated by sunlight at any time of the day, so as to heighten power generation efficiency.

Photovoltaic brackets are usually installed in outdoor environments, where strong winds and other adverse weather conditions are inevitable. In such adverse weather conditions, the photovoltaic panels of the photovoltaic brackets will swing violently, which will greatly affect the stability and safety of the photovoltaic brackets.

Figure 7:
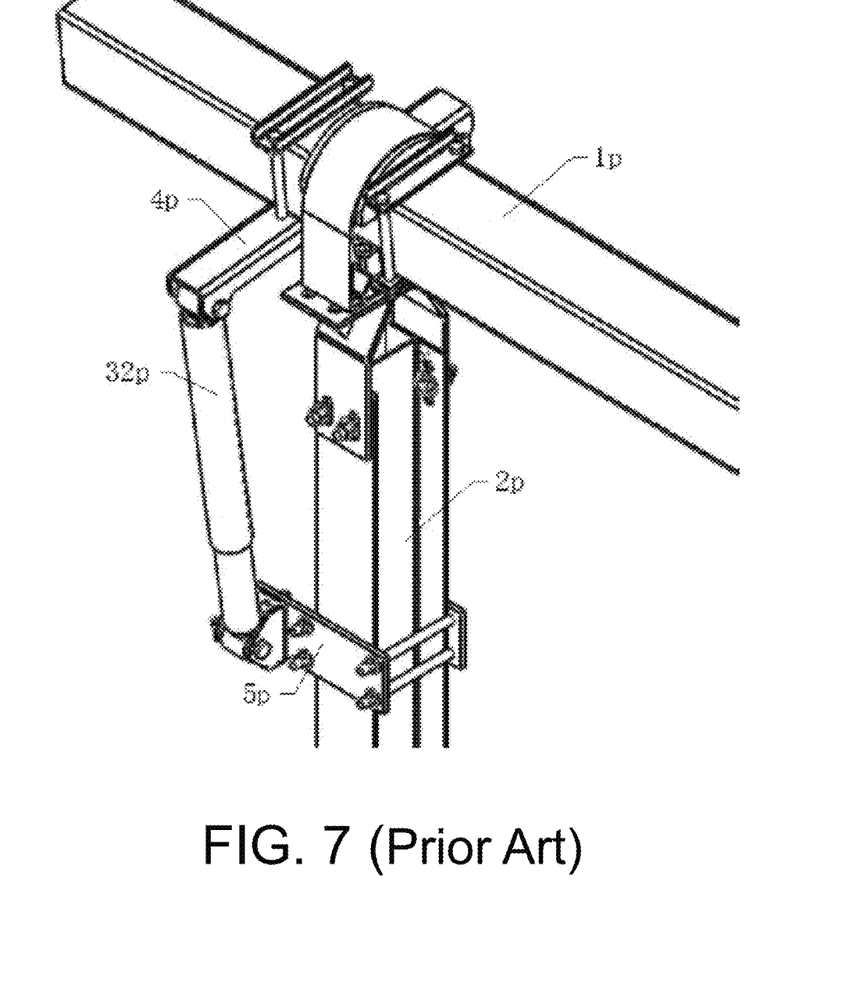
FIG. 7 is a three-dimensional view of the prior art.

Referring to FIG. 7, in prior art, in order to lessen the oscillation of the photovoltaic panel, the usual practice is to fix an extension rod $4p$ on the main beam $1p$. The end of the extension rod $4p$ that is far away from the main beam $1p$ can be rotatably connected to the damper $32p$, the other end of the damper $32p$ can be rotatably fixed to the crossbar $5p$, and the crossbar $5p$ is fixed to the column $2p$. When the main beam 1 rotates, it drives the extension rod $4p$ to rotate synchronously. In comparison, when the extension rod $4p$ rotates, it drives the damper $32p$ to expand and contract.

It should be pointed out that since the extension rod $4p$ is a straight rod, the extension rod $4p$ can only drive the damper 32 to move within a small range. Besides, the transmission ratio between the extension rod $4p$ and the damper $32p$ is limited, which affects the damping effect.

SUMMARY OF THE INVENTION

In response to the aforementioned technical issues, the present invention is intended to provide a solar bracket with a damping mechanism, which can change the transmission ratio between the rotating assembly and the damper. In such case, the damper can play a better damping effect and augment the stability of the photovoltaic tracking system.

To achieve the above objectives, the present invention provides a solar bracket with a damping mechanism, comprising:

Bracket structure, including fixed and rotating components;
A solar panel installed on the rotating component of the bracket structure;
Damping mechanism, comprising a rotating assembly and a damping component, wherein the rotating assembly comprises a first rotating part and a second rotating part, wherein the first rotating part is fixedly installed on the rotating component, the second rotating part is connected to the damping component, the first rotating part is transmitted and connected to the second rotating part, and the rotation radius of the first rotating part is greater than that of the second rotating part. When the rotating component drives the first rotating part to rotate, the first rotating part drives the second rotating part to rotate, and the second rotating part drives the damping component to act to limit the rotational speed of the rotating component.

Preferably, the first rotating part is an arc-shaped component, and the side of the arc-shaped component far from the rotating assembly is an arc-shaped side edge, and a set of first meshing teeth is set along the arc-shaped side edge;

The outer surface of the second rotating part has a predetermined arc-shaped area. Besides, is equipped with a set of second meshing teeth, wherein the first meshing teeth and the second meshing teeth are connected in mesh with each other.

Preferably, the second rotating part is a gear, with the second meshing teeth set on all four sides.

Preferably, the damping mechanism further comprises a transmission rope, the second rotating part being a drum, the main body of the transmission rope being wound around the drum, the two ends of the transmission rope being spaced at different components of the rotating assembly, and the rotating assembly located between the two ends of the transmission rope forming the first rotating part. When the rotating assembly rotates, it can drive the two ends of the transmission rope to move up and down, and the transmission rope can drive the drum to rotate.

Preferably, the damping mechanism further comprises a second arc-shaped component, which is installed on the rotating component, forming the first rotating part. The side of the second arc-shaped component away from the rotating component is an arc-shaped surface, while the arc-shaped surface has a capacity groove. The two ends of the transmission rope are respectively fixed at the two ends of the second arc-shaped component, and at least a component of the two ends of the transmission rope is accommodated in the capacity groove.

Preferably, the damping mechanism further comprises a mounting component, wherein the mounting component is fixed to the rotating component, and the second arc-shaped component is fixed to the mounting component.

Preferably, the damping mechanism further comprises a crank, with one end of the crank fixed to the second rotating part and the other end rotatably connected to the damping component.

Preferably, the damping mechanism further comprises a mounting bracket, wherein the second rotating part is rotatably mounted on the mounting bracket, and the damping component is rotatably mounted on the mounting bracket at one end away from the second rotating part.

Preferably, the fixed component of the bracket structure comprises a column, the second rotating part is rotatably mounted on the column, and the damping component is rotatably mounted on the column at one end away from the second rotating part.

Preferably, the damping mechanism comprises a connecting shaft and two or more damping components, wherein the connecting shaft is fixed to the second rotating part, the second rotating part can drive the connecting shaft to rotate, the two or more damping components can be rotatably connected to the second rotating part and/or the connecting shaft, and there is a predetermined angle between the two or more damping components, and at least one of the length extension directions of the damping components does not pass through the connecting shaft during the rotation of the second rotating part.

Compared with prior art, the solar bracket with a damping mechanism provided by the present invention has at least one beneficial effect:
1. The solar bracket with a damping mechanism provided by the present invention can change the transmission ratio between the rotating component and the damper, enabling the damper to exert better damping effect and elevate the stability of the photovoltaic tracking system;
2. The solar bracket with a damping mechanism provided by the present invention is equipped with a rotating assembly between the rotating component of the bracket structure and the damping component. The rotating assembly can transfer force between the rotating assembly and the damping component, greatly saving space, reducing the volume of the damping mechanism, and effectively increasing the force arm;
3. The solar bracket with a damping mechanism provided by the present invention has multiple damping components and a predetermined angle between two or more of the damping components. During the rotation of the second rotating part, at least one of the length extension directions of the damping components does not pass through the rotation axis of the second rotating part.

BRIEF DESCRIPTION OF THE DRAWINGS

Next, the preferred embodiments will be explained in a clear and understandable manner, combined with the accompanying drawings, so as to further illustrate the above features, technical features, advantages, and implementation methods of the present invention.

DESCRIPTION OF THE REFERENCE SIGNS

Bracket structure 1, fixed component 11, column 111, rotating component 12, damping mechanism 3, rotating assembly 31, first rotating part 311, arc-shaped component 3111, arc-shaped side 3112, first meshing tooth 3113, transmission rope 3114, second rotating part 312, second meshing tooth 3121, drum 3122, second arc-shaped component 313, cable groove 3130, installation component 314, damping component 32, crank 33, installation frame 34, connecting shaft 35, support plate 36, bearing 112, main beam 121, purlin 122, main beam 1p, extension rod 4p, crossbar 5p, damper 32p.

DETAILED DESCRIPTION OF THE EMBODIMENTS

In an effort to provide a clearer description on the embodiments of the present invention or the technical solutions in the prior art, the specific embodiments of the present invention will be described below with reference to the accompanying drawings. It is apparent that the accompanying drawings described below are only some embodiments of the present invention. For those skilled in the art, other drawings and implementation methods can be obtained on the basis of these drawings without creative labor.

To make the drawings concise, only the components related to the invention are schematically represented in each figure, and they do not represent the actual structure of the product. In addition, to make the diagram concise and easy to understand, in some drawings, only one of the components with the same structure or function is schematically illustrated, or only one of them is marked. In this article, "one" not only represents "only this one", but can also refer to the situation of "more than one".

It should be further understood that the terms "and/or" used in the present application and the accompanying claims refer to any combination of one or more of the items listed in association and all possible combinations, and include these combinations.

In this disclosure, it should be noteworthy that unless otherwise specified and limited, the terms "installation", "association", and "connection" should be broadly understood. For instance, they can be fixed connections, detachable connections, or integrated connections; it can be a mechanical connection or an electrical connection; it can be directly connected, or indirectly connected through an intermediate medium, or it can be an internal association between two components. For ordinary technical personnel in this field, the specific meanings of the above terms in the present invention can be understood in specific situations.

Aside from that, in the description of this application, the terms "first", "second", etc. are only used to distinguish descriptions and cannot be understood as indicating or implying relative importance.

Referring to FIGS. 1 to 6, the solar bracket with a damping mechanism provided by the present invention is described accordingly. The solar bracket with a damping mechanism has a damping mechanism, which can prevent the main rope from swinging violently when the solar panel shakes, thereby elevating the stability of the photovoltaic tracking system.

To be specific, the solar bracket with a damping mechanism comprises a bracket structure 1, a solar panel, and a damping mechanism 3. The bracket structure 1 includes a fixed component 11 and a rotating component 12. The solar panel is installed on the rotating component 12 of the bracket structure 1. The damping mechanism 3 includes a rotating assembly 31 and a damping component 32, which are connected to the rotating component 12 and the damping component 32. The rotating component 12 can drive the rotating assembly 31 to rotate. Besides, the damping component 32 is used for limiting the rotating assembly 31 to rotate at a speed not exceeding a preset speed, so as to limit the rotational speed of the rotating component 12.

In this preferred embodiment, setting the rotating assembly 31 between the damping component 32 and the rotating component 12 can elevate the transmission efficiency between the rotating component 12 and the damping component 32, and better limit the rotating component 12 of the bracket structure 1. On the other hand, by having a smaller volume through the rotating assembly 31, the overall volume of the solar bracket is reduced, thereby reducing the force arm of the transmission.

Furthermore, the rotating assembly 31 comprises a first rotating part 311 and a second rotating part 312. The first rotating part 311 is fixedly installed on the rotating component 12, the second rotating part 312 is connected to the damping component 32, and the first rotating part 311 is transmitted and connected to the second rotating part 312, and the rotation radius of the first rotating part 311 is greater than that of the second rotating part 312. When the rotating component 12 drives the first rotating part 311 to rotate, the first rotating part 311 drives the second rotating part 312 to rotate, and the second rotating part 312 drives the damping component 32 to move. It is preferred to drive the damping component 32 to expand and contract to limit the rotation speed of the rotating component 12.

It should be pointed out that the damping component 32 can expand and contract at a speed not exceeding the pre-approval. When the solar bracket is in normal working conditions, the rotating component 12 of the bracket structure 1 drives the solar panel to rotate slowly to adjust the orientation of the solar panel. The rotating component 12 drives the damping component 32 to slowly expand and contract through the rotating assembly 31. In severe weather conditions such as strong winds, the solar panel will bear a greater force and have a tendency to drive the rotating component 12 to rotate rapidly. The rotating component 12 has a tendency to drive the damping component 32 to expand and contract rapidly through the rotating assembly 31. At this time, the damping component 32 slowly expands and contracts. The rapid rotation of the rotating component 12 can heighten the stability of the solar bracket.

Figure 1:
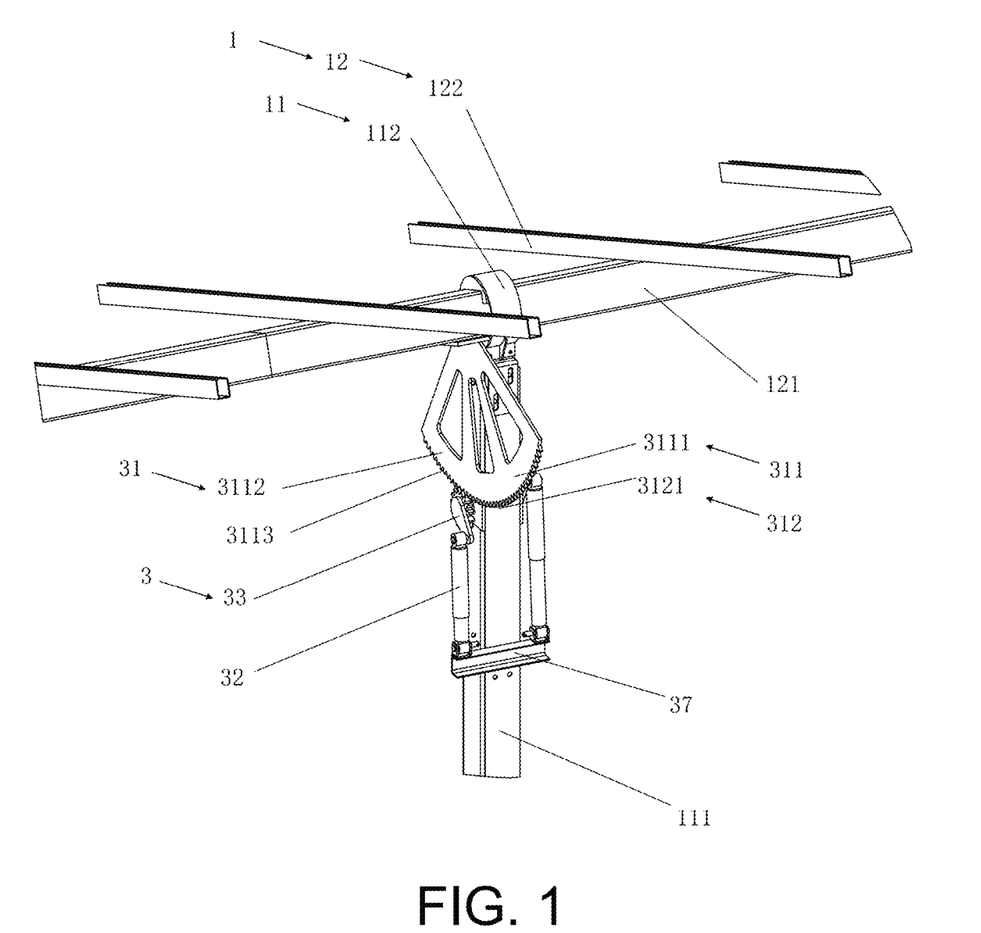
FIGS. 1 and 2 are three-dimensional views of a solar bracket with a damping mechanism in the first preferred embodiment of the present invention.
Figure 2:
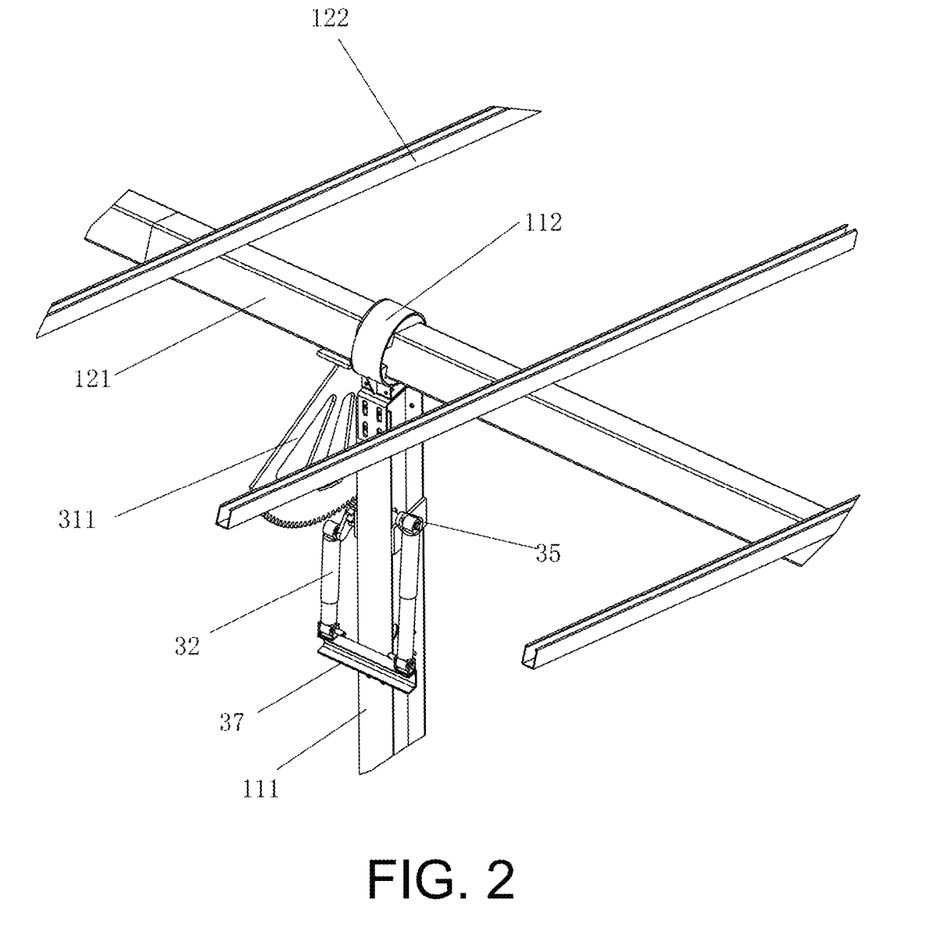

Referring to FIGS. 1 and 2, in the first preferred embodiment, the first rotating part 311 is an arc-shaped component 3111. The side of the arc-shaped component 3111 away from the rotating component 12 is an arc-shaped side edge 3112, and a set of first meshing teeth 3113 is provided along the arc-shaped side edge 3112.

The outer surface of the second rotating part 312 has an arc-shaped area with a predetermined angle, and is equipped with a set of second meshing teeth 3121. The first meshing teeth 3113 and the second meshing teeth 3121 are connected in mesh with each other.

Preferably, the second rotating part 312 is a gear, and the second meshing tooth 3121 is provided on all four sides. Preferably, the second meshing tooth 3121 is uniformly distributed around the gear. Optionally, the second meshing teeth 3121 can also be unevenly distributed, that is, the distance between adjacent second meshing teeth 3121 may be different.

Figure 3:
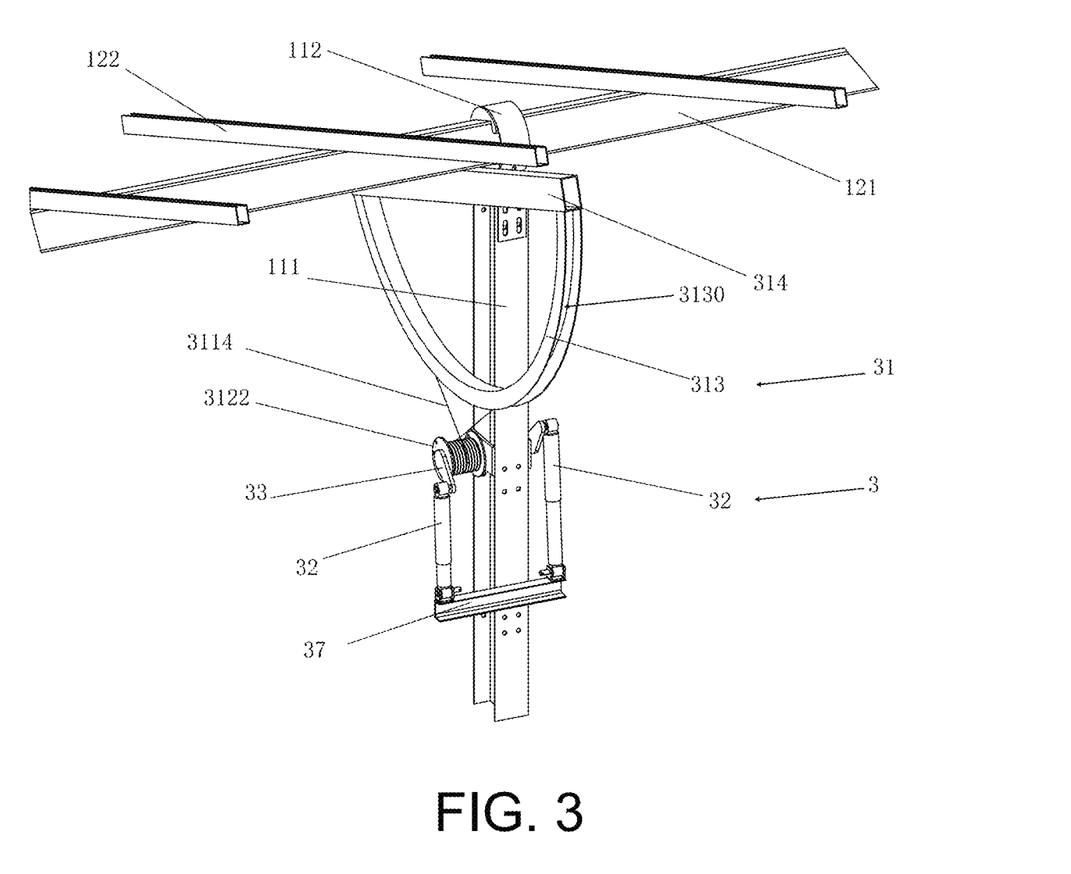
FIGS. 3 and 4 are three-dimensional views of a solar bracket with a damping mechanism in the second preferred embodiment of the present invention.
Figure 4:
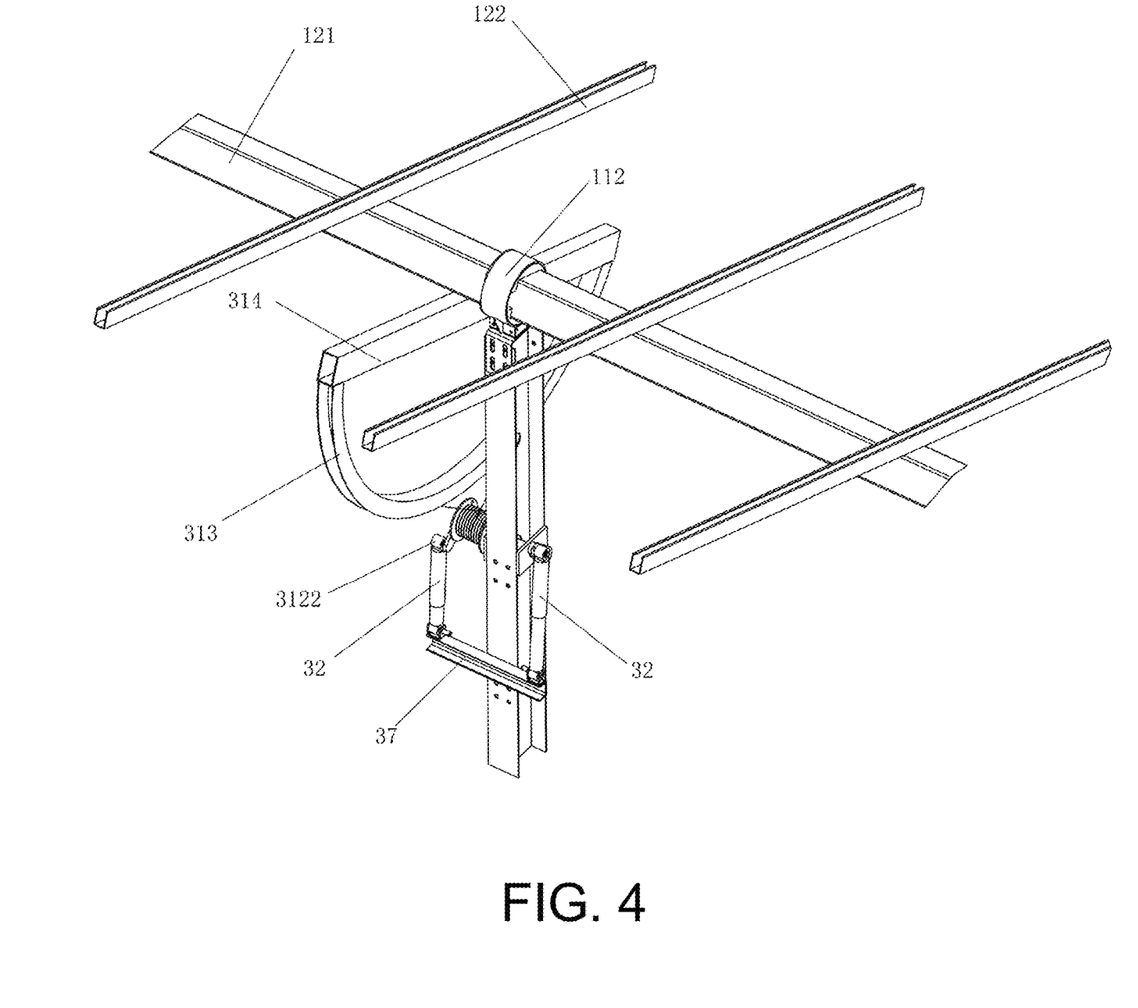

Referring to FIGS. 3 and 4, in the second preferred embodiment, the damping mechanism 3 further comprises a transmission rope 3114. The second rotating part 312 is a drum 3122. The main body of the transmission rope 3114 is wound around the drum 3112, and the two ends of the transmission rope 3114 are spaced at different components of the rotating component 12. The rotating component 12 located between the two ends of the transmission rope 3114 forms the first rotating part 311. When the rotating component 12 rotates, it can drive the two ends of the transmission rope 3114 to move up and down, and the transmission rope 3114 can drive the drum 3122 to rotate.

Referring to FIGS. 3 and 4, furtherly, the damping mechanism 3 further comprises a second arc-shaped component 313. The second arc-shaped component 313 is installed on the rotating component 12, forming the first rotating part 311. The side of the second arc-shaped component 313 away from the rotating component 12 is an arc-shaped surface, and the arc-shaped surface has a capacity groove 3130. The two ends of the transmission rope 3114 are respectively fixed to the two ends of the second arc-shaped component 313. Moreover, at least a component of the two ends of the transmission rope 3114 is accommodated in the capacity groove 3130.

When the rotating component 12 of the bracket structure 1 rotates, the rotating component 12 can drive the second arc-shaped component 313 to rotate, and the outer surface of the second arc-shaped component 313 can contact the transmission rope 3114 and push the transmission rope 3114 to move.

Furtherly, the damping mechanism 3 also comprises an installation component 314, which is fixed to the rotating component 12, and the second arc-shaped component 313 is fixed to the installation component 314. Preferably, the mounting component 314 is a hollow tube fixed to the rotating component 12 of the bracket structure 1.

Referring to FIGS. 1 to 4, further, the damping mechanism 3 further comprises a crank 33, one end of which is fixed to the second rotating part 312, and the other end is rotatably connected to the damping component 32. The crank 33 can increase the distance between one end of the damping component 32 connected to the second rotating part 312 and the shaft of the second rotating part 312, and increase the rotational radius of the damping component 32 connected to one end of the second rotating part 312.

Furtherly, the damping mechanism 3 further includes an installation bracket 34. The second rotating part 312 can be rotatably installed on the mounting bracket 34, and the damping component 32 can be rotatably installed on the mounting bracket 34 at one end away from the second rotating part 312.

Referring to FIGS. 1 to 4, the fixing component 11 of the bracket structure 1 includes a column 111. The second rotating part 312 is rotatably installed on the column 111, and the damping component 32 is rotatably installed on the column 111 at one end away from the second rotating part 312. To put it another way, the column 111 forms the mounting bracket 34. Optionally, the mounting bracket 34 can also be independent of the column 111 and located at a suitable position on one side or around the column 111.

Referring to FIGS. 1 to 4, it is preferable that the damping mechanism 3 comprises a connecting shaft 35 and two or more damping components 32. The connecting shaft 35 is fixed to the second rotating part 312, which can drive the connecting shaft 35 to rotate. Two or more damping components 32 can be rotatably connected to the second rotating part 312 and/or the connecting shaft 35. There is a predetermined angle between the two or more damping components 32, and during the rotation of the second rotating part 312, at least one of the length extension directions of the damping components 32 does not pass through the connecting shaft 35.

By setting two or more damping components 32 at a certain angle, the two or more damping components 32 can cooperate and complement each other. In such case, when the second rotating part 312 rotates to any angle, both or more damping components 32 can provide appropriate resistance to the second rotating part 312.

Referring to FIGS. 1 to 4, the connecting shaft 35 passes through the column 111, and there is a damping component 32 installed on each side of the column 111. Optionally, in other preferred embodiments of the present invention, two or more damping components 32 are installed on each side of the column 111. It can be understood that the number of damping components should not constitute a limitation on the present invention. Optionally, the damping component 32 on the connecting shaft 35 can also be located on the same side of the column 111, and the specific position of the damping component 32 on the connecting shaft 35 should not constitute a limitation of the present invention.

Referring to FIGS. 1 to 4, the damping mechanism 3 further includes a bottom support component 37 installed at the bottom of the column 111, and the bottom of the damping component 32 can be rotatably installed on the bottom support component 37. The bottom support component 37 extends from the column 111 to both sides, and the damping components 32 on both sides of the column 111 are rotatably installed on the bottom support component 37.

Figure 5:
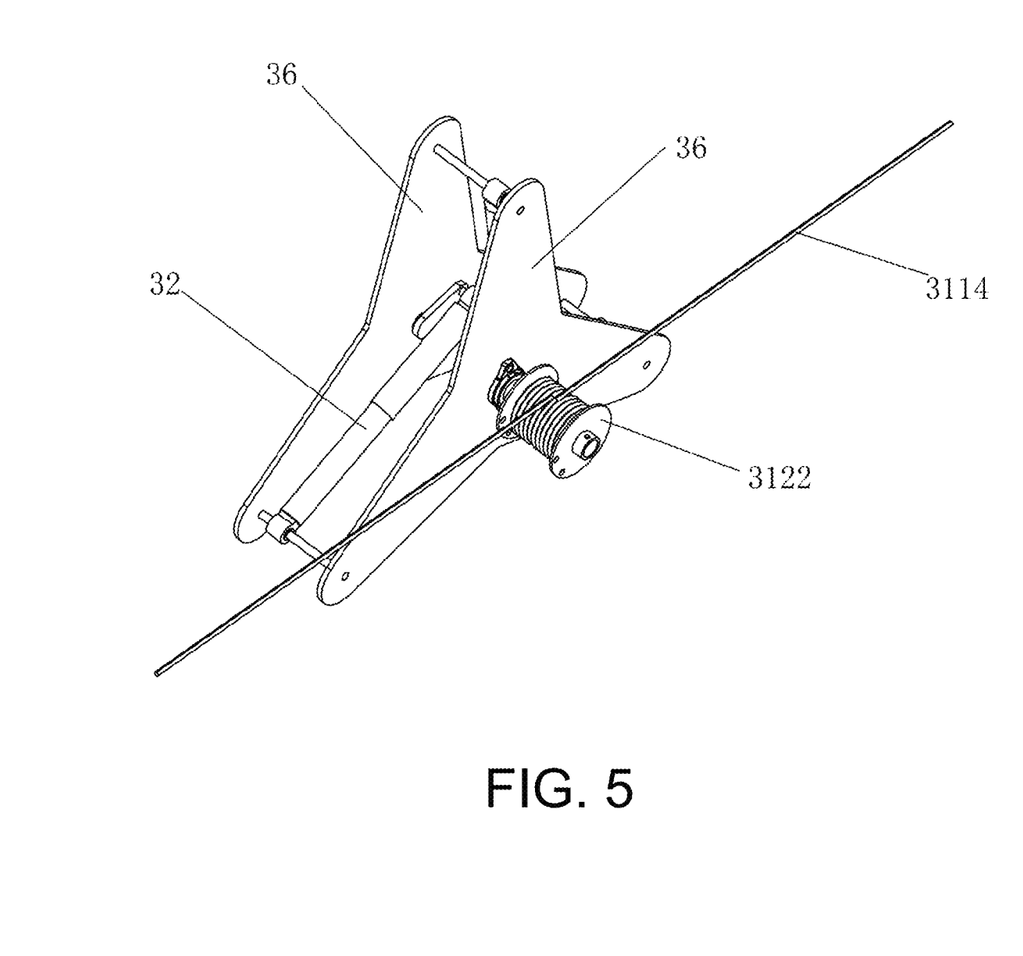
FIG. 5 is a three-dimensional diagram of a modified embodiment of the damping mechanism of a solar bracket with a damping mechanism in a preferred embodiment of the present invention.
Figure 6:
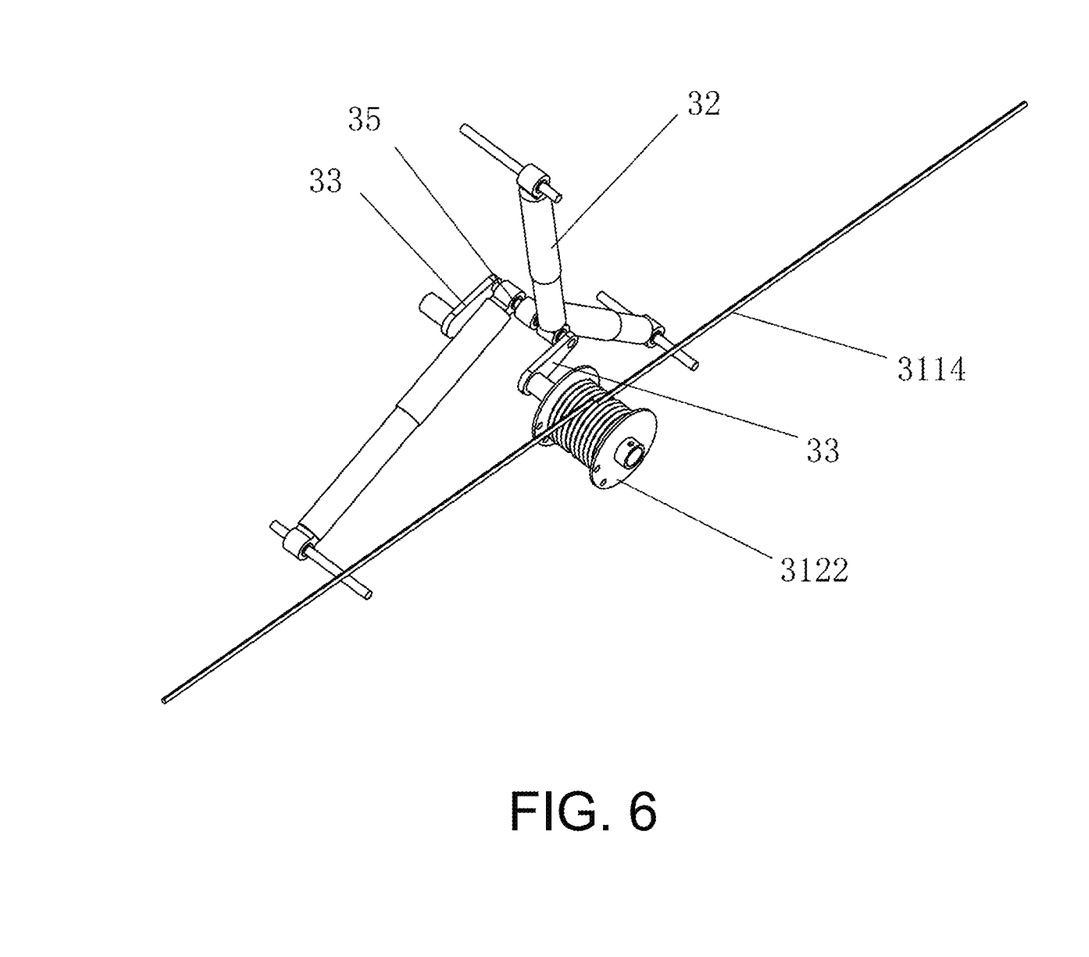
FIG. 6 is a partial schematic diagram of a modified embodiment of the damping mechanism of a solar bracket with a damping mechanism in a preferred embodiment of the present invention.

Referring to FIGS. 5 and 6, the connecting shaft 35 is connected to the crank 33, and there are two or more damping components 32 rotatably installed on the connecting shaft 35, and there is a preset angle between the two or more damping components 32. The two ends of the connecting shaft 35 are respectively connected to a crank 33, and the two cranks are rotatably connected to two support plates 36. Preferably, two cranks 33, two or more damping components 32, and connecting shaft 35 are located between these two support plates 36, and the second rotating part 312 is located on the outer side of support plate 36.

Referring to FIGS. 1 to 4, the fixing component 11 further includes a bearing 112 installed on the top of the column 111. The rotating component 12 includes a main beam 121 and a purlin 122. The main beam 121 can be rotatably installed on the bearing 112, and the purlin 122 is fixedly installed on the main beam 122. When the main beam 121 rotates, it can drive the purlin 122 to rotate. The solar panel is installed on the purlin 122.

It should be noteworthy that the above embodiments can be freely combined as needed. The above are only preferred embodiments of the present invention. It should be pointed out that for ordinary technical personnel in the art, several improvements and embellishments can be made without departing from the principles of the present invention. These improvements and embellishments should also be considered as the scope of protection of the present invention.

What is claimed is:

1. A solar bracket with a damping mechanism, comprising:
   a bracket structure, including a fixed component and a rotating component;
   a solar panel, installed on the rotating component of the bracket structure;
   a damping mechanism, including a rotating assembly and a damping component,
   wherein the rotating assembly comprises a first rotating part and a second rotating part, the first rotating part is fixedly installed on the rotating component, the second rotating part is connected to the damping component, the first rotating part is transmitted and connected to the second rotating part, and a rotation radius of the first rotating part is greater than that of the second rotating part, when the rotating component drives the first rotating part to rotate, the first rotating part drives the second rotating part to rotate, and the second rotating part drives the damping component to move to limit a rotation speed of the rotating component.

2. The solar bracket with the damping mechanism according to claim 1, wherein the first rotating part is an arc-shaped component, and a side of the arc-shaped component away from the rotating assembly is an arc-shaped side, and a set of first meshing teeth is set along the arc-shaped side;
   an outer surface of the second rotating part has a predetermined arc-shaped area, and is equipped with a set of second meshing teeth, wherein the first meshing teeth and the second meshing teeth are connected in mesh with each other.

3. The solar bracket with the damping mechanism according to claim 2, wherein the second rotating part is a gear, and the second meshing teeth are set on all four sides.

4. The solar bracket with the damping mechanism according to claim 1, wherein the damping mechanism further comprises a transmission rope, the second rotating part is a drum, a main body of the transmission rope is wound around the drum, two ends of the transmission rope are spaced at different components of the rotating assembly, and the rotating assembly located between the two ends of the transmission rope forms the first rotating part, when the rotating assembly rotates, the rotating assembly drives the two ends of the transmission rope to move up and down, and the transmission rope drives the drum to rotate.

5. The solar bracket with the damping mechanism according to claim 4, wherein the damping mechanism further comprises a second arc-shaped component, wherein the second arc-shaped component is installed on the rotating component, and the second arc-shaped component forms the first rotating part, a side of the second arc-shaped component away from the rotating assembly is an arc-shaped surface, and the arc-shaped surface has a capacity groove, the two ends of the transmission rope are respectively fixed at two ends of the second arc-shaped component, and at least a component of the two ends of the transmission rope is accommodated in the capacity groove.

6. The solar bracket with the damping mechanism according to claim 5, wherein the damping mechanism further comprises a mounting component, which is fixed to the rotating component, and the second arc-shaped component is fixed to the mounting component.

7. The solar bracket with the damping mechanism according to claim 1, wherein the damping mechanism further comprises a crank, one end of the crank is fixed to the second rotating part, and an other end of the crank is rotatably connected to the damping component.

8. The solar bracket with the damping mechanism according to claim 7, wherein the damping mechanism further comprises a mounting bracket, wherein the second rotating part is rotatably mounted on the mounting bracket, and the damping component is rotatably mounted on the mounting bracket at one end away from the second rotating part.

9. The solar bracket with the damping mechanism according to claim 7, wherein the fixed component of the bracket structure comprises a column, the second rotating part is rotatably mounted on the column, and the damping component is rotatably mounted on the column at one end away from the second rotating part.

10. The solar bracket with the damping mechanism according to claim 8, wherein the damping mechanism comprises a connecting shaft and two or more damping components, wherein the connecting shaft is fixed to the second rotating part, the second rotating part drives the connecting shaft to rotate, the two or more damping components are rotatably connected to at least one of the second rotating part and the connecting shaft, the two or more damping components have a predetermined angle between them, during the rotation of the second rotating part, at least one of length extension directions of the damping components does not pass through the connecting shaft.

11. The solar bracket with the damping mechanism according to claim 9, wherein the damping mechanism comprises a connecting shaft and two or more damping components, wherein the connecting shaft is fixed to the second rotating part, the second rotating part drives the connecting shaft to rotate, the two or more damping components are rotatably connected to at least one of the second rotating part and the connecting shaft, the two or more damping components have a predetermined angle between them, during the rotation of the second rotating part, at least one of length extension directions of the damping components does not pass through the connecting shaft.

12. The solar bracket with the damping mechanism according to claim 2, wherein the damping mechanism further comprises a crank, one end of the crank is fixed to the second rotating part, and an other end of the crank is rotatably connected to the damping component.

13. The solar bracket with the damping mechanism according to claim 3, wherein the damping mechanism further comprises a crank, one end of the crank is fixed to the second rotating part, and an other end of the crank is rotatably connected to the damping component.

14. The solar bracket with the damping mechanism according to claim 4, wherein the damping mechanism further comprises a crank, one end of the crank is fixed to the second rotating part, and an other end of the crank is rotatably connected to the damping component.

15. The solar bracket with the damping mechanism according to claim 5, wherein the damping mechanism further comprises a crank, one end of the crank is fixed to the second rotating part, and an other end of the crank is rotatably connected to the damping component.

16. The solar bracket with the damping mechanism according to claim 6, wherein the damping mechanism further comprises a crank, one end of the crank is fixed to the second rotating part, and an other end of the crank is rotatably connected to the damping component.

* * * * *